(12) United States Patent
Takai et al.

(10) Patent No.: US 7,636,215 B2
(45) Date of Patent: Dec. 22, 2009

(54) MAGNETIC RECORDING MEDIUM, RECORDING/REPRODUCING APPARATUS, AND METHOD OF MANUFACTURING A MAGNETIC RECORDING MEDIUM

(75) Inventors: Mitsuru Takai, Tokyo (JP); Shuichi Okawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/972,868

(22) Filed: Jan. 11, 2008

(65) Prior Publication Data
US 2008/0174914 A1 Jul. 24, 2008

(30) Foreign Application Priority Data
Jan. 19, 2007 (JP) .............................. 2007-009884

(51) Int. Cl.
*G11B 5/09* (2006.01)
*G11B 5/86* (2006.01)
(52) U.S. Cl. ..................... 360/48; 360/16; 428/848.5
(58) Field of Classification Search .................. None
See application file for complete search history.

(56) References Cited
U.S. PATENT DOCUMENTS
2006/0012903 A1   1/2006   Asakura et al.
2006/0012904 A1*  1/2006   Naruse et al. .............. 360/48
2006/0014053 A1   1/2006   Asakura et al.

FOREIGN PATENT DOCUMENTS
JP   2006-031855   2/2006
JP   2006-031856   2/2006

OTHER PUBLICATIONS
English language Abstract of JP 2006-031855.
English language Abstract of JP 2006-031856.
U.S. Appl. No. 11/972,645 to Okawa et al., which was filed on Jan. 11, 2008.

* cited by examiner

*Primary Examiner*—Andrew L Sniezek
(74) *Attorney, Agent, or Firm*—Greenblum & Bernstein P.L.C.

(57) ABSTRACT

On a magnetic recording medium, data track patterns and servo patterns are formed on one surface and another surface of a disk-shaped substrate by patterns including recording regions and non-recording regions. In the data track patterns on the one surface, the non-recording regions are formed at formation positions on the one surface corresponding to formation positions of recording regions in the data track patterns on the other surface and the recording regions are formed at formation positions on the one surface corresponding to formation positions of non-recording regions in the data track patterns on the other surface, and in the servo patterns on the one surface, the non-recording regions are formed at formation positions on the one surface corresponding to formation positions of recording regions in the servo patterns on the other surface and the recording regions are formed at formation positions on the one surface corresponding to formation positions of non-recording regions in the servo patterns on the other surface.

3 Claims, 9 Drawing Sheets

MAGNETIC RECORDING MEDIUM, RECORDING/REPRODUCING APPARATUS, AND METHOD OF MANUFACTURING A MAGNETIC RECORDING MEDIUM

BACKGROUND OF THE INVENTION

1. Field of the Invention

The present invention relates to a magnetic recording medium where data track patterns and servo patterns are formed on both one surface and another surface of a disk-shaped substrate by patterns with recording regions and non-recording regions, a recording/reproducing apparatus equipped with such magnetic recording medium, and a method of manufacturing such magnetic recording medium.

2. Description of the Related Art

As one example of this type of magnetic recording medium, Japanese Laid-Open Patent Publication No. 2006-31855 discloses a double-sided magnetic disk for perpendicular recording. This magnetic disk is a DTR medium (discrete track medium) and has data region patterns and servo region patterns formed on both a front surface and a rear surface thereof. On this magnetic disk, the servo region patterns are arranged in different orders in the circumferential direction on the front surface and the rear surface, and therefore different patterns are formed on the front surface and the rear surface. More specifically, on this magnetic disk, as one example, the servo region patterns are arranged in an anti-clockwise order on the front surface and the servo region patterns are arranged in a clockwise order on the rear surface.

When manufacturing this magnetic disk, a stamper for the front surface and a stamper for the rear surface that will be used to manufacture the magnetic disk by imprinting are manufactured first. More specifically, by carrying out exposure/lithography on a resist layer applied onto a master, an exposure pattern for the data region patterns and servo region patterns is formed. Next, by carrying out developing or the like on the resist layer on which the exposure/lithography has been completed, a concave/convex pattern composed of a resist layer is formed on the master. After this, once the surface of the master on which the concave/convex pattern is formed has been made electrically conductive, electroforming is carried out to form a layer of nickel. Next, after the nickel layer has been separated from the master, a center portion and the outer edge portion thereof are removed by punching out. By doing so, the stamper for the front surface, for example, is completed. After this, in the same way as the method of manufacturing the stamper for the front surface, the stamper for the rear surface is manufactured.

Next, the concave/convex patterns of both stampers are transferred to the body being processed to manufacture a magnetic disk by imprint lithography. More specifically, first, a resist is applied onto the front surface and the rear surface of the processed body and baked to form the respective resist layers. Next, the processed body and both stampers are set in an imprinting apparatus and the concave/convex patterns of both stampers are pressed into both resist layers of the processed body. By doing so, the concave/convex patterns of the stampers are transferred to the resist layers to form concave/convex patterns in the front surface and the rear surface of the processed body. After this, on each surface, the magnetic layer at the bottom surfaces of the concaves is removed by ion milling using the concave/convex pattern as a mask. By doing so, concave/convex patterns are formed in the magnetic layers. Next, a layer of non-magnetic material is formed so as to cover both concave/convex patterns of the processed body and reverse sputtering is carried out on the non-magnetic material to expose the magnetic material (convexes) from the surface of the non-magnetic material. By doing so, the surface of the processed body is smoothed. After this, by forming a carbon protective layer and applying a lubricating rub so as to cover the front surface and the rear surface, the magnetic disk is completed.

SUMMARY OF THE INVENTION

However, by investigating the conventional magnetic disk described above, the present inventors found the following problem. That is, since the order in which the servo region patterns are arranged differs on the front surface and the rear surface of the conventional magnetic disk, it is necessary during the manufacturing of this magnetic disk to separately manufacture the stamper for the front surface and the stamper for the rear surface. When manufacturing this type of stamper, an extremely long time is required by exposure/lithography of patterns on the resist layers. As a specific example, to manufacture a stamper for the front surface, for example, when manufacturing a magnetic disk with a 0.85-inch diameter, exposure/lithography takes around three days. When manufacturing a magnetic disk with a 1.0-inch diameter, exposure/lithography takes five days, when manufacturing a magnetic disk with a 1.89-inch diameter, exposure/lithography takes fifteen days, when manufacturing a magnetic disk with a 2.5-inch diameter, exposure/lithography takes twenty-five days, and when manufacturing a magnetic disk with a 3.5-inch diameter, exposure/lithography takes fifty days.

Accordingly, for a conventional magnetic disk that requires two stampers, i.e., a front surface stamper and a rear surface stamper, when manufacturing the stampers required to manufacture a 3.5-inch magnetic disk, for example, an extremely long exposure/lithography process that takes fifty days for each disk, or a total of one hundred days is required. Due to exposure/lithography taking so much time, the manufacturing cost of the stampers becomes extremely high. This results in the problem that it is difficult to reduce the manufacturing cost of the conventional magnetic disk.

The present invention was conceived in view of the problem described above and it is an object of the present invention to provide a magnetic recording medium with a reduced manufacturing cost, a recording/reproducing apparatus equipped with the magnetic recording medium, and a method of manufacturing the magnetic recording medium.

On a magnetic recording medium according to the present invention, data track patterns and servo patterns are formed on one surface and another surface of a disk-shaped substrate by patterns including recording regions and non-recording regions, wherein in the data track patterns on the one surface, the non-recording regions are formed at formation positions on the one surface corresponding to formation positions of the recording regions in the data track patterns on the other surface and the recording regions are formed at formation positions on the one surface corresponding to formation positions of the non-recording regions in the data track patterns on the other surface, and in the servo patterns on the one surface, the non-recording regions are formed at formation positions on the one surface corresponding to formation positions of the recording regions in the servo patterns on the other surface and the recording regions are formed at formation positions on the one surface corresponding to formation positions of the non-recording regions in the servo patterns on the other surface.

The expression "recording regions" in the present specification refers to regions that are constructed so as to hold a recorded magnetic signal in a readable manner (that is, regions constructed so as to have the ability to hold a magnetic signal in a readable manner). Similarly, the expression "non-recording regions" in the present specification refers to regions that are constructed so that an ability thereof to hold a recorded magnetic signal in a readable manner is lower than that of the recording regions, or regions constructed so as not to effectively have such ability. More specifically, the expression "non-recording regions" in the present specification refers to regions that emit a smaller magnetic field than that of the recording regions described above in a state where a magnetic signal has been recorded, or regions that effectively do not emit a magnetic field.

Also, the expression "formation positions on the one surface corresponding to formation positions of recording regions in the data track patterns on the other surface" refers to positions at which recording regions or non-recording regions in data track patterns on the one surface associated with servo patterns (servo tracks) on the one surface that correspond to servo patterns (servo tracks) associated with recording regions in data track patterns on the other surface should be formed, and the expression "formation positions on the one surface corresponding to formation positions of non-recording regions in the data track patterns on the other surface" refers to positions at which recording regions or non-recording regions in data track patterns on the one surface associated with servo patterns (servo tracks) on the one surface that correspond to servo patterns (servo tracks) associated with non-recording regions in data track patterns on the other surface should be formed.

Also, the expression "formation positions on the one surface corresponding to formation positions of recording regions in the servo patterns on the other surface" refers to positions at which recording regions or non-recording regions in servo patterns on the one surface that functionally correspond to recording regions in servo patterns on the other surface should be formed, and the expression "formation positions on the one surface corresponding to formation positions of non-recording regions in the servo patterns on the other surface" refers to positions at which recording regions or non-recording regions in servo patterns on the one surface that functionally correspond to non-recording regions in servo patterns on the other surface should be formed.

This includes not only positions where the recording regions (or non-recording regions) on the respective surfaces of the substrate are formed at opposing positions in the thickness direction of the substrate on the one surface and the other surface but also positions that are not opposing. Accordingly, when recording regions and non-recording regions are formed by forming a concave/convex pattern on each surface by imprinting, in a state where there are no displacements in the circumferential direction (i.e., the direction of rotation of the magnetic recording medium) or the radial direction of each stamper pressed onto the surfaces, the positions at which the recording regions or non-recording regions should be formed on the one surface will be opposite the formation positions of corresponding recording regions (or non-recording regions) on the other surface in the thickness direction of the substrate. However, when such displacements occur, the positions at which the recording regions or non-recording regions should be formed on the one surface will not be opposite the formation positions of the corresponding recording regions (or non-recording regions) on the other surface in the thickness direction of the substrate.

A recording/reproducing apparatus according to the present invention is equipped with the magnetic recording medium described above.

A method of manufacturing a magnetic recording medium according to the present invention manufactures a magnetic recording medium where data track patterns and servo patterns are formed on one surface and another surface of a disk-shaped substrate for manufacturing a magnetic recording medium by patterns including recording regions and non-recording regions, the method including: forming the data track patterns and the servo patterns on the one surface using a first stamper on which a first concave/convex pattern is formed; and forming the data track patterns and the servo patterns on the other surface using a second stamper on which a second concave/convex pattern is formed, where in the second concave/convex pattern, concaves are formed at formation positions corresponding to formation positions of convexes in the first concave/convex pattern and convexes are formed at formation positions corresponding to formation positions of concaves in the first concave/convex pattern.

According to the magnetic recording medium, the recording/reproducing apparatus, and the method of manufacturing a magnetic recording medium described above, the first stamper for forming a pattern on the one surface and the second stamper for forming a pattern on the other surface that are used during the manufacturing of the magnetic recording medium can be manufactured by carrying out a single exposure/lithography process during the manufacturing of a master stamper. This means that compared to the conventional magnetic disk where at least two exposure/lithography processes are required to manufacture two types of stampers, i.e., a front surface stamper and a rear surface stamper, it is possible during manufacturing to sufficiently reduce the time required to manufacture the stampers, and therefore it is possible to sufficiently reduce the manufacturing cost of the magnetic recording medium and a recording/reproducing apparatus equipped with such magnetic recording medium.

It should be noted that the disclosure of the present invention relates to a content of Japanese Patent Application 2007-009884 that was filed on 19 Jan. 2007 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a magnetic recording medium, a recording/reproducing apparatus, and a method of manufacturing a magnetic recording medium according to the present invention will now be described with reference to the attached drawings.

First, the construction of a recording/reproducing apparatus according to the present invention will be described with reference to the drawings.

Figure 1:
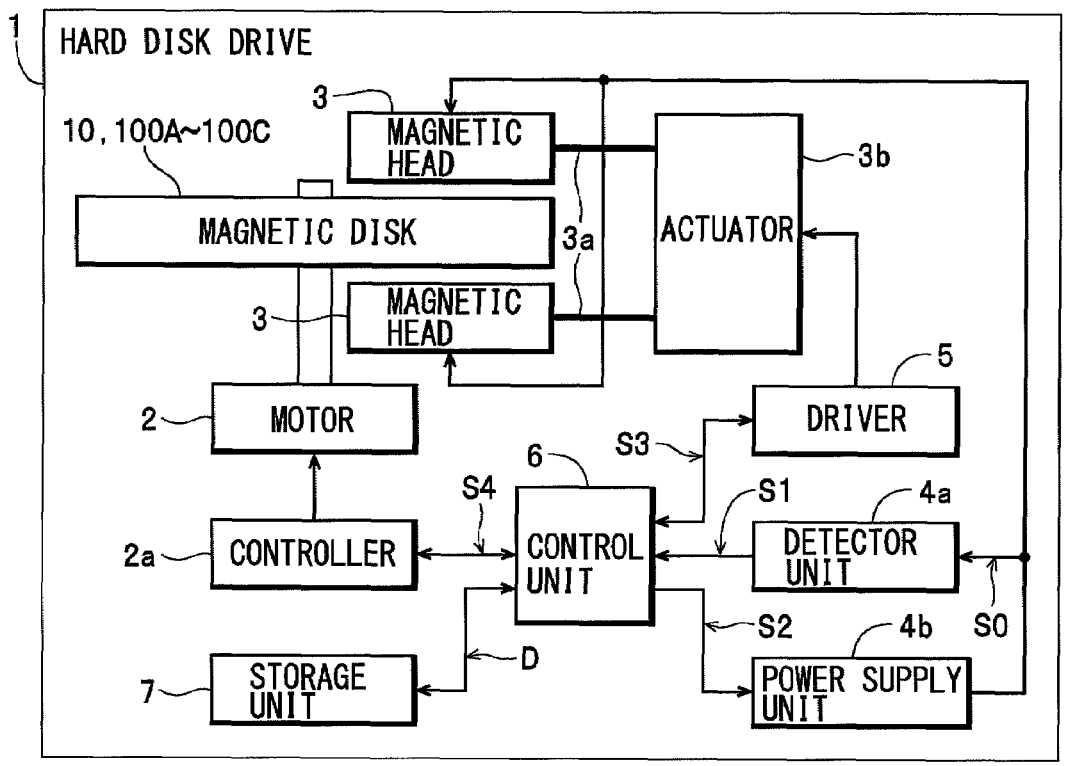
FIG. 1 is a schematic diagram showing the construction of a hard disk drive.
Figure 2:
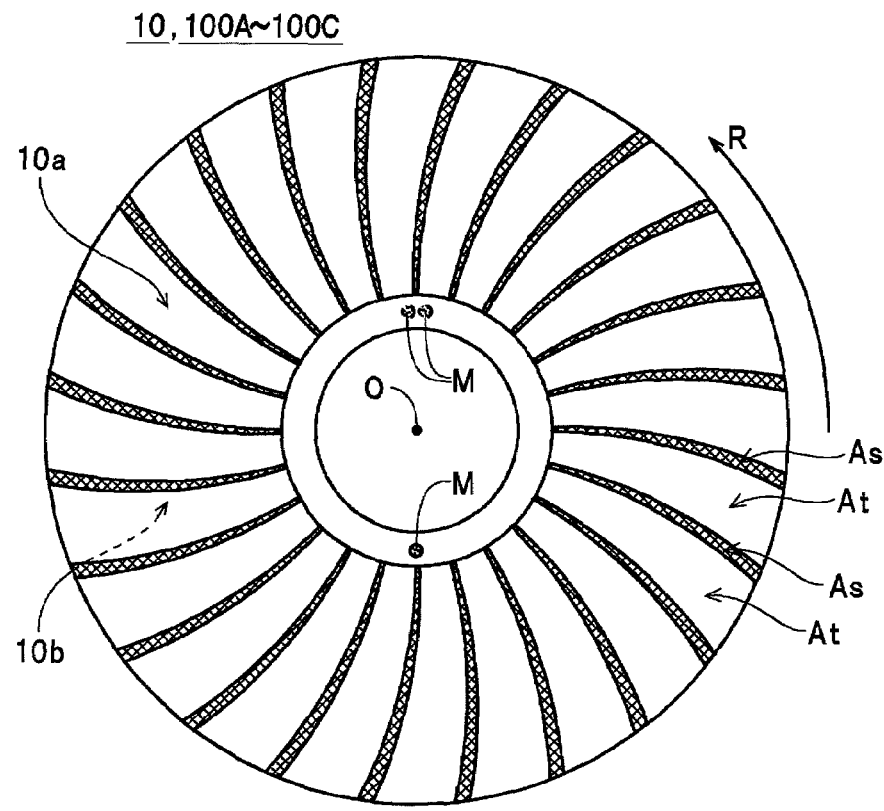
FIG. 2 is a plan view of a magnetic disk according to embodiments of the present invention when viewed from a first surface side thereof.
Figure 3:
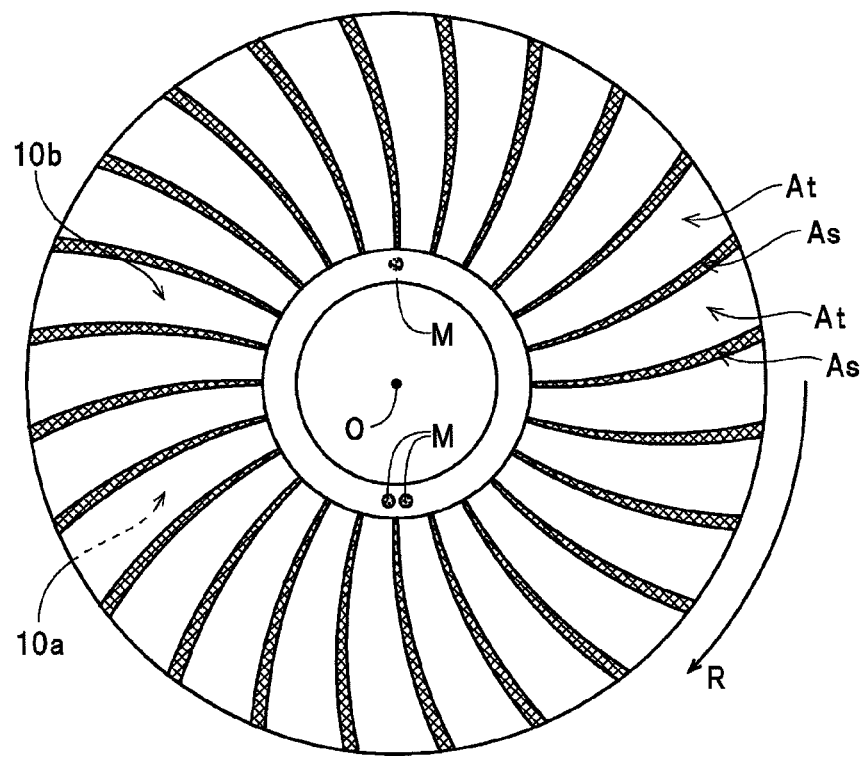
FIG. 3 is a plan view of a magnetic disk according to the embodiments when viewed from a second surface side thereof.

A hard disk drive 1 shown in FIG. 1 is one example of a recording/reproducing apparatus according to the present invention, includes a motor 2, a controller 2a, a pair of magnetic heads 3, a detector unit 4a, a power supply unit 4b, a driver 5, a control unit 6, a storage unit 7, and a magnetic disk 10, and is constructed so as to be capable of recording and reproducing various types of data. Note that although the hard disk drive 1 is actually equipped with plural magnetic disks 10 and has a pair of magnetic heads 3 provided for each magnetic disk 10, for ease of understanding the present invention, a drive equipped with a single magnetic disk 10 and a pair of magnetic heads 3 for carrying out recording and reproducing of data on the magnetic disk 10 will be described below. Here, the magnetic disk 10 is a discrete track medium (one example of a patterned medium) for double-sided recording as one example of a magnetic recording medium according to the present invention. As shown in FIGS. 2 and 3, the magnetic disk 10 is formed in an overall disk shape and is attached to a rotational shaft of the motor 2. On the other hand, the motor 2 rotates the magnetic disk 10 at a constant velocity, for example 4200 rpm, in accordance with control by the control unit 6. A controller 2a rotates the motor 2 in accordance with a control signal S4 outputted from the control unit 6.

Out of the magnetic heads 3, one magnetic head 3 is disposed facing a first surface 10a of the magnetic disk 10 and is attached to an actuator 3b via a swing arm 3a and the other magnetic head 3 is disposed facing a second surface 10b of the magnetic disk 10 and is attached to the actuator 3b via a swing arm 3a. Here, both magnetic heads 3 are moved over the magnetic disk 10 by rotating the swing arms 3a using the actuator 3b during the recording and reproducing of data on the magnetic disk 10. The magnetic heads 3 carry out reads of servo signals from servo pattern regions As (see FIGS. 2, 3, and 5) of the magnetic disk 10, magnetic writes of data in data recording regions At (see FIGS. 2, 3, and 5), and reads of data that has been magnetically written in the data recording regions At. Note that although the magnetic heads 3 are each actually constructed by forming a recording element and a reproducing element on the base surface (i.e., air bearing surface) of a slider for causing the magnetic head 3 to fly above the magnetic disk 10, the sliders, the recording elements, and the reproducing elements are omitted from the description and drawings. According to a driving current supplied from the driver 5 under the control of the control unit 6, the actuator 3b swings the swing arms 3a to move the magnetic heads 3 to a freely chosen recording/reproducing position on the magnetic disk 10.

The detector unit 4a extract servo data from an output signal S0 (analog signal: servo signal) outputted from the magnetic head 3 to generate a detection signal S1, and outputs the generated detection signal S1 to the control unit 6. During the recording of data on the magnetic disk 10, the power supply unit 4b supplies an AC voltage whose potential is reversed at predetermined periods to the magnetic head 3 in accordance with a control signal S2 outputted from the control unit 6. The driver 5 controls the actuator 3b in accordance with a control signal S3 outputted from the control unit 6 to make a magnetic head 3 on-track to a desired data recording track. The control unit 6 carries out overall control over the hard disk drive 1. Also, based on the detection signal (servo data) S1 outputted from the detector unit 4a and servo control data D stored in the storage unit 7, the control unit 6 controls the controller 2a, the power supply unit 4b, and the driver 5 (i.e., the control unit 6 carries out a tracking servo control process and a recording/reproducing process for data). The storage unit 7 stores the servo control data D mentioned above and the like.

Figure 4:
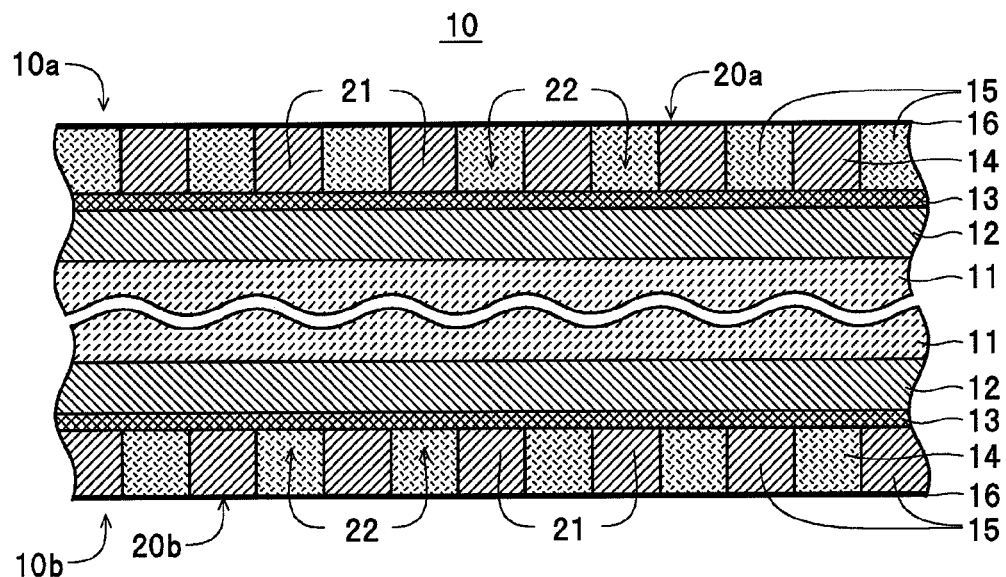
FIG. 4 is a cross-sectional view of a magnetic disk.

The magnetic disk 10 is installed inside the case of the hard disk drive 1 together with the motor 2, the magnetic head 3, and the like. As shown in FIG. 4, the magnetic disk 10 is constructed by forming a soft magnetic layer 12, an intermediate layer 13, and a magnetic layer 14 in the mentioned order on the first surface 10a (the "one surface" for the present invention) and the second surface 10b (the "other surface" for the present invention) of a glass substrate 11. As one example, data can be recorded on the magnetic disk 10 using a perpendicular recording method. Here, as shown in FIGS. 2 and 3, the magnetic disk 10 is constructed with one identification mark M formed in the center on the first surface 10a and two identification marks M formed in the center on the second surface 10b so that the first surface 10a and the second surface 10b can be distinguished by the number of identification marks M. Also, as shown in FIG. 4, the respective magnetic layers 14 are composed of plural convexes 21 whose protruding end parts (the upper end parts in FIG. 4) for example are formed of magnetic material and concaves 22 disposed between adjacent convexes 21 to construct a concave/convex pattern 20a on the first surface 10a and a concave/convex pattern 20b on the second surface 10b. Also, a non-magnetic material 15 such as $SiO_2$, C (carbon) or resin material is filled inside the concaves 22 in the concave/convex patterns 20a, 20b to smooth the surfaces of the magnetic disk 10.

In this case, on the magnetic disk 10, the formation regions of the convexes 21 correspond to "recording regions" for the present invention and the formation regions of the concaves 22 correspond to "non-recording regions" for the present invention. In addition, on the magnetic disk 10, as described later, the formation positions of the convexes 21 and the concaves 22 are reversed in the concave/convex pattern 20a on the first surface 10a and the concave/convex pattern 20b on the second surface 10b. In addition, on both the first surface 10a and the second surface 10b of the magnetic disk 10, a protective layer 16 (a DLC film) with a thickness of around 2 nm is formed of diamond-like carbon (DLC) or the like so as to cover the non-magnetic material 15 filled in the concaves 22 (i.e. filled between the adjacent convexes 21) and on the surfaces of the magnetic layer 14 (the convexes 21). A lubricant (as one example, a Fomblin lubricant) is also applied onto the surface of each protective layer 16 to prevent damage to both the magnetic head 3 and the magnetic disk 10.

Note that the expression "the formation positions are reversed" in the present specification includes a state where the non-recording regions (i.e., the concaves 22) are formed at formation positions on the other surface (i.e., the second surface 10b) corresponding to formation positions of the recording regions (i.e., the convexes 21) on the one surface (i.e., the first surface 10a) and the recording regions (i.e., the convexes 21) are formed at formation positions on the other surface (i.e., the second surface 10b) corresponding to formation positions of the non-recording regions (i.e., the convexes 22) on the one surface (i.e., the first surface 10a), and also a state where the non-recording regions are formed at formation positions on the one surface (i.e., the first surface 10a) corresponding to formation positions of the recording regions on the other surface (i.e., the second surface 10b) and the recording regions are formed at formation positions on the one surface (i.e., the first surface 10a) corresponding to formation positions of the non-recording regions on the other surface (i.e., the second surface 10b).

The glass substrate 11 corresponds to a "substrate" for manufacturing a magnetic recording medium of the present invention and is formed in a disk-like shape with a thickness of around 0.6 mm by polishing the surface of a glass plate. Note that the "substrate" for the present invention is not limited to a glass substrate and it is possible to use a substrate formed in a disk-like shape using various types of non-magnetic material such as aluminum and ceramics. On each surface, the soft magnetic layer 12 is formed into a thin film with a thickness of around 50 nm to 200 nm, inclusive by sputtering a soft magnetic material such as CoZrNb alloy. The intermediate layer 13 functions as an underlayer for forming the magnetic layer 14 and is formed into a thin film with a thickness of around 40 nm by sputtering an intermediate layer forming material such as Ru, Cr or a non-magnetic CoCr alloy. As described earlier, the magnetic layer 14 is a layer that constructs the concave/convex patterns 20a, 20b (the data track patterns 20t and the servo patterns 20s shown in FIG. 5) and the concaves 22 are formed by etching a layer produced by sputtering CoCrPt alloy, for example.

As shown in FIGS. 2 and 3, on both the first surface 10a and the second surface 10b of the magnetic disk 10, the servo pattern regions As are provided between the data recording regions At and are defined so that the data recording regions At and the servo pattern regions As are alternately disposed in the direction of rotation of the magnetic disk 10 (i.e., the direction of the arrow R). Note that in the present specification, each region sandwiched by two data recording regions At aligned in the direction of rotation (i.e., each region from a trailing end in the direction of rotation of a data recording region At to a leading end in the direction of rotation of the next data recording region At) is regarded as a servo pattern region As. Also, the ends in the direction of rotation of the data recording regions At are set as coinciding with virtual segments (linear or arc-shaped segments along the radial direction of the magnetic disk 10) that join the respective ends in the direction of rotation of plural data recording tracks (the convexes 21) formed in the data recording regions At.

The hard disk drive 1 equipped with the magnetic disk 10 is constructed so that the magnetic disk 10 is rotated at a fixed angular velocity by the motor 2 in accordance with control by the control unit 6 as described earlier. Accordingly, as shown in FIGS. 2 and 3, on the magnetic disk 10, the length of each data recording region At along the direction of rotation of the magnetic disk 10 and the length of each servo pattern region As along the direction of rotation are set so as to increase as the distance from the center O of the data track patterns 20t increases (i.e., the data recording regions At and the servo pattern regions As are set so as to widen from an inner periphery region toward an outer periphery region) in proportion to the length of a part of the magnetic disk 10 that passes below the magnetic head 3 per unit time. As a result, the length along the direction of rotation of the protruding end surfaces of the data recording tracks (the convexes 21) formed inside the data recording regions At, the standard length along the direction of rotation of the protruding end surfaces of the convexes 21 used in the servo patterns 20s formed inside the servo pattern regions As, and the standard gap length (i.e., the length of a gap between facing ends of the protruding end surfaces of two adjacent convexes 21: for example a length corresponding to the unitary signal length) along the direction of rotation of the concaves 22 used in the servo patterns 20s are set so as to increase from the inner periphery region toward the outer periphery region of the magnetic disk 10.

Figure 5:
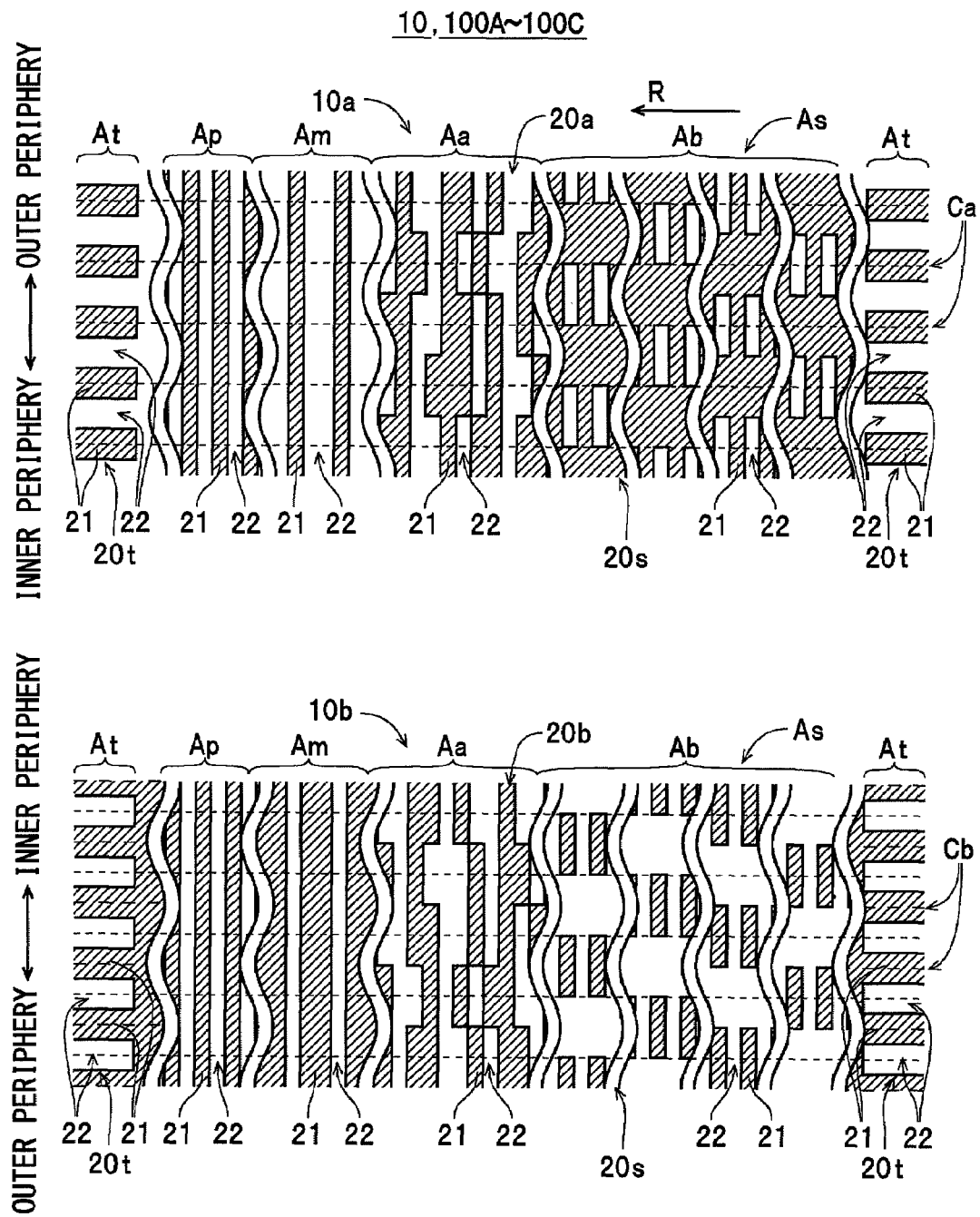
FIG. 5 is a plan view of data recording regions and a servo pattern region on the magnetic disk according to the embodiments.

Also, as shown in FIG. 5, a data track pattern 20t is formed in each data recording region At. Note that the obliquely shaded regions in FIG. 5 show formation positions of the convexes 21 ("recording regions" for the present invention) in the concave/convex patterns 20a, 20b. In this example, the data track patterns 20t inside the data recording regions At are composed of plural convexes 21 (long belt-shaped convexes 21 that are continuously formed and elongated along the direction of rotation of the magnetic disk 10) that construct a large number of data recording tracks that are concentric (or spiral) about the center O (see FIGS. 2 and 3) and are disposed a predetermined pitch apart, and plural concaves 22 (the concaves 22 between the convexes 21 or "inter-track concaves") that construct guard band parts. As one example, the convexes 21 and the concaves 22 inside the data recording regions At are set on both the first surface 10a and the second surface 10b so that the respective lengths thereof along the radial direction are substantially equal and are formed so that the formation pitch of the convexes 21 (that is, the track pitch of the data recording tracks) and the length of the convexes 21 in the radial direction of the magnetic disk 10 (that is, the lengths in the radial direction of the data recording tracks and the guard band parts) are substantially equal across the entire range from the inner periphery of the magnetic disk 10 to the outer periphery on both the first surface 10a and the second surface 10b.

Here, on the magnetic disk 10, in the data track patterns 20t (i.e., the concave/convex pattern 20a) formed in the data recording regions At on the first surface 10a, the convexes 21 are formed at formation positions on the first surface 10a corresponding to formation positions of concaves 22 in the data track patterns 20t (the concave/convex pattern 20b) inside the data recording regions At on the second surface 10b, and the concaves 22 are formed at formation positions on the first surface 10a corresponding to formation positions of convexes 21 in the data track patterns 20t (the concave/convex pattern 20b) inside the data recording regions At on the second surface 10b. That is, on the magnetic disk 10, the formation positions of the convexes 21 and the concaves 22 inside the data recording regions At are reversed on the first surface 10a and the second surface 10b. Note that although it is preferable for the center of rotation of the magnetic disk 10 and the center O of the data track patterns 20t to match on both the first surface 10a and the second surface 10b, there is the risk of a minute displacement of 30 µm to 50 µm being caused between the center of rotation of the magnetic disk 10 and the center O of the data track patterns 20t due to manufacturing errors for the first surface 10a and the second surface 10b. However, since tracking servo control can still be performed sufficiently for the magnetic heads 3 when displacements of such magnitude are present, the center of rotation and the center O can be thought of as effectively matching.

On the other hand, in each servo pattern region As, plural regions are aligned in the direction of rotation, and concave/convex patterns 20a, 20b (the servo patterns 20s) with plural convexes 21 and plural concaves 22 that construct various servo patterns for tracking servo control are formed inside such regions. More specifically, as shown in FIG. 5, a preamble pattern region Ap in which a preamble pattern is formed by the servo pattern 20s, a servo address mark region Am in which servo address marks (i.e., a servo address mark pattern) are formed by the servo pattern 20s, an address pattern region Aa in which an address pattern is formed by the servo pattern 20s, and a burst pattern region Ab in which burst patterns are formed by the servo pattern 20s are defined in the mentioned order in the direction of rotation inside each servo pattern region As. Four burst regions Ab1 to Ab4 corresponding to signal regions for such burst patterns are defined inside the burst pattern region Ab. Note that although in reality the convexes 21 and the concaves 22 are given skew angles in the servo pattern 20s described above in the inner periphery region and the outer periphery region of the magnetic disk 10, for ease of understanding the present invention, the skew angles have been omitted from the description and drawings.

In each preamble pattern region Ap, plural belt-shaped convexes 21 elongated in the radial direction (the up-down direction in FIG. 5) of the magnetic disk 10 are formed along the direction of rotation (the direction of the arrow R) of the magnetic disk 10 with concaves 22 in between. More specifically, the preamble pattern formed in each preamble pattern region Ap is a servo pattern for correcting a base clock, which is used when reading various types of control signal from the address pattern region Aa, the burst pattern region Ab, and the like, in accordance with the rotational state (rotational velocity) of the magnetic disk 10. As one example, the length along the direction of rotation of the convexes 21 and the concaves 22 is set at a length corresponding to "1" or "0" in the servo data.

Here, the length along the direction of rotation of the convexes 21 and the length along the direction of rotation of the concaves 22 formed in the preamble pattern region Ap are set so as to be equal at positions with the same radius (i.e., where the distance from the center O is equal) and so as to increase from an inner periphery region of the magnetic disk 10 toward the outer periphery region of the magnetic disk 10. Also, on the magnetic disk 10, in the servo patterns 20s (the concave/convex pattern 20a) formed in the preamble pattern regions Ap on the first surface 10a, the concaves 22 are formed at formation positions on the first surface 10a corresponding to formation positions of the convexes 21 of the servo patterns 20s (the concave/convex pattern 20b) inside the preamble pattern regions Ap on the second surface 10b and the convexes 21 are formed at formation positions on the first surface 10a corresponding to formation positions of the concaves 22 in the servo patterns 20s (the concave/convex pattern 20b) inside the preamble pattern regions Ap on the second surface 10b.

As the servo address marks formed in each servo address mark region Am, plural belt-shaped convexes 21 elongated in the radial direction (i.e., the up-down direction in FIG. 5) of the magnetic disk 10 and plural belt-shaped concaves 22 elongated in the radial direction are aligned in the direction of rotation of the magnetic disk 10 (i.e., the direction of the arrow R). More specifically, the servo address marks are a servo pattern for specifying a read start position of an address pattern, and the length along the direction of rotation of the convexes 21 and the length along the direction of rotation of the concaves 22 that are formed in the servo address mark region Am are set so that at positions with the same radius (i.e., positions where the distance from the center O is equal), as one example, on the first surface 10a, the length of the concaves 22 is double the length of the convexes 21 and on the second surface 10b, the length of the convexes 21 is double the length of the concaves 22. The length along the direction of rotation of the convexes 21 and the length along the direction of rotation of the concaves 22 that are formed in the servo address mark region Am are also set so that such lengths are greater in the outer periphery region of the magnetic disk 10 than in the inner periphery region on both the first surface 10a and the second surface 10b of the magnetic disk 10.

In addition, on the magnetic disk 10, in the servo pattern 20s (the concave/convex pattern 20a) formed in each servo address mark region Am on the first surface 10a, concaves 22 are formed at formation positions on the first surface 10a corresponding to formation positions of convexes 21 in the servo pattern 20s (the concave/convex pattern 20b) in each servo address mark region Am on the second surface 10b and convexes 21 are formed at formation positions on the first surface 10a corresponding to formation positions of concaves 22 in the servo pattern 20s (the concave/convex pattern 20b) in each servo address mark region Am on the second surface 10b.

The address pattern formed in each address pattern region Aa corresponds to address data showing the track number of the track on which the magnetic head 3 is being kept and the sector number of the sector at which the magnetic head 3 is positioned. In an address pattern, the length of each convex 21 along the direction of rotation and the length of each concave 22 along the direction of rotation are set separately for the first surface 10a and the second surface 10b. Here, on the magnetic disk 10, in the servo pattern 20s (the concave/convex pattern 20a) formed in each address pattern region Aa on the first surface 10a, concaves 22 are formed at formation positions on the first surface 10a corresponding to formation positions of convexes 21 in the servo pattern 20s (the concave/convex pattern 20b) inside an address pattern region Aa on the second surface 10b, and convexes 21 are formed at formation positions on the first surface 10a corresponding to formation positions of concaves 22 in the servo pattern 20s (the concave/convex pattern 20b) inside the address pattern region Aa on the second surface 10b.

In each burst pattern region Ab, burst patterns (i.e., servo patterns for position detection) for producing burst signals for correcting the position of a magnetic head 3 above the magnetic disk 10 are formed. On the magnetic disk 10, plural concaves 22 that are rectangular in planar form are formed in each burst region on the first surface 10a and plural convexes 21 that are rectangular in planar form are formed in each burst region on the second surface 10b. In each servo pattern 20s (the concave/convex pattern 20a) formed in a burst pattern region Ab on the first surface 10a, convexes 21 are formed at formation positions on the first surface 10a corresponding to formation positions of concaves 22 in the servo pattern 20s (the concave/convex pattern 20b) in a burst pattern region Ab on the second surface 10b and concaves 22 are formed at formation positions on the first surface 10a corresponding to formation positions of convexes 21 of the servo pattern 20s (the concave/convex pattern 20b) in a burst pattern region Ab on the second surface 10b. In this way, on the magnetic disk 10, the formation positions of the convexes 21 and the concaves 22 are reversed in the entire servo pattern region As.

Next, the method of manufacturing the magnetic disk 10 will be described.

Figure 6:
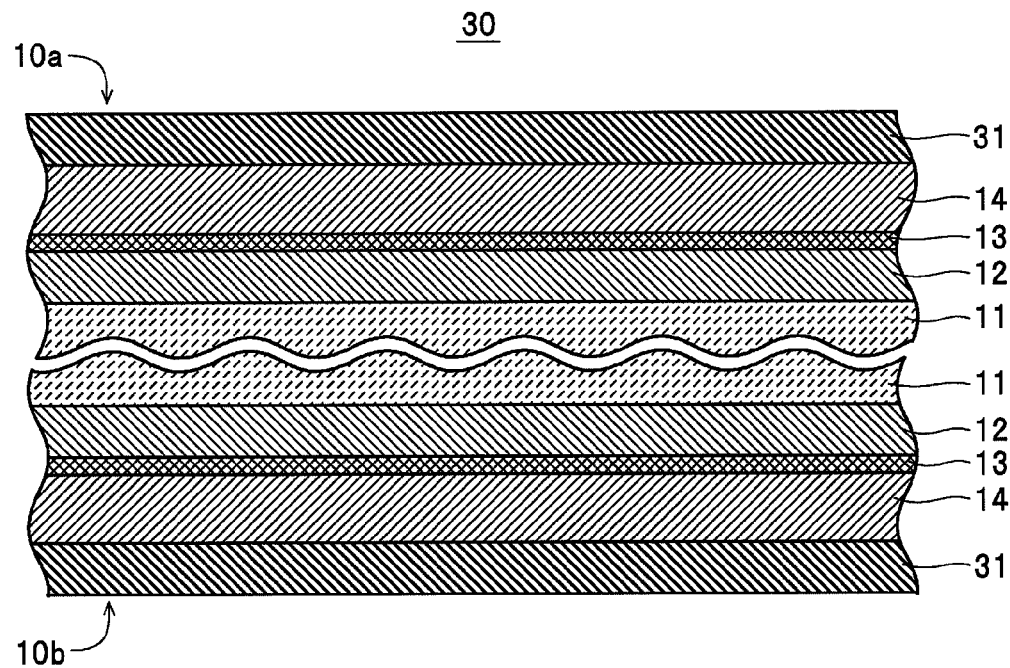
FIG. 6 is a cross-sectional view of a preform.
Figure 7:
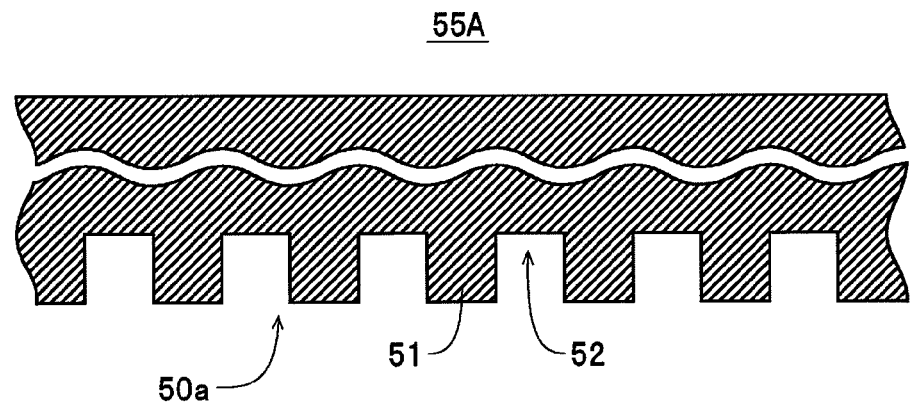
FIG. 7 is a cross-sectional view of a stamper.
Figure 8:
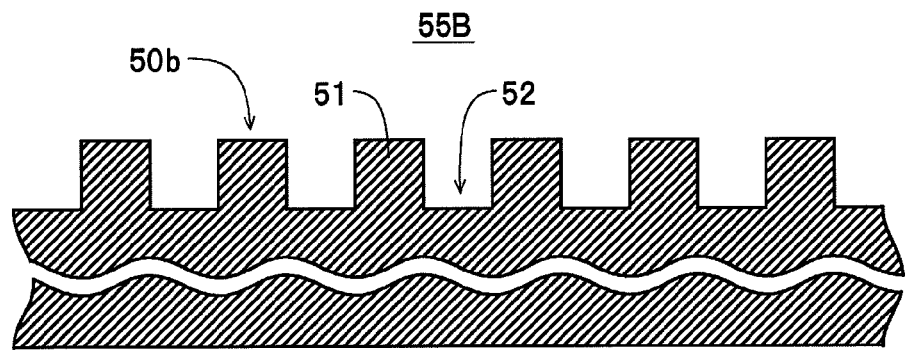
FIG. 8 is a cross-sectional view of another stamper.

When manufacturing the magnetic disk 10 described above, a preform 30 shown in FIG. 6 and stampers 55A, 55B shown in FIGS. 7 and 8 are used. Here, the preform 30 is produced by laminating the soft magnetic layer 12, the intermediate layer 13, and the magnetic layer 14 in the mentioned order on the first surface 10a and the second surface 10b of the glass substrate 11, and on both the first surface 10a and the second surface 10b, the magnetic layer 14 is covered by a metal mask layer 31. Also, when manufacturing the magnetic disk 10, as described later, both metal mask layers 31 of the preform 30 are covered by a layer of UV-curable resin for transferring concave/convex patterns 50a, 50b (see FIGS. 7 and 8) of the stampers 55A, 55B (i.e., the stamper is in a state where UV-curable resin is applied onto each metal mask layer 31).

The stamper 55A corresponds to a "first stamper" for the present invention, and as described later a concave/convex pattern 50a capable of forming a mask pattern (a concave/convex pattern 40a shown in FIG. 18) used to form the concave/convex pattern 20a (i.e., the data track patterns 20t and the servo patterns 20s on the first surface 10a) on the first surface 10a side of the preform 30 is formed thereupon by carrying out a transfer process on a master stamper 75 (see FIG. 12) an even number of times. More specifically, as shown in FIG. 7, in the concave/convex pattern 50a of the stamper 55A, convexes 51 are formed corresponding to the concaves 22 in the concave/convex pattern 20a to be formed on the first surface 10a of the magnetic disk 10 and concaves 52 are formed corresponding to the convexes 21 in the concave/convex pattern 20a of the magnetic disk 10.

Also, the stamper 55B is one example of a "second stamper" for the present invention, and as described later a concave/convex pattern 50b capable of forming a mask pattern (a concave/convex pattern 40b shown in FIG. 18) used to form the concave/convex pattern 20b (i.e., the data track patterns 20t and the servo patterns 20s on the second surface 10b) on the second surface 10b side of the preform 30 is formed thereupon by carrying out a transfer process on the master stamper 75 an odd number of times. More specifically, as shown in FIG. 8, in the concave/convex pattern 50b of the stamper 55B, convexes 51 are formed corresponding to the concaves 22 in the concave/convex pattern 20b of the magnetic disk 10 and concaves 52 are formed corresponding to the convexes 21 in the concave/convex pattern 20b of the magnetic disk 10. Accordingly, on the stamper 55A, convexes 51 are formed at formation positions corresponding to formation positions of concaves 52 on the stamper 55B and convexes 52 are formed at formation positions corresponding to formation positions of convexes 51 on the stamper 55B, and on the stamper 55B, convexes 51 are formed at formation positions corresponding to formation positions of concaves 52 on the stamper 55A and concaves 52 are formed at formation positions corresponding to formation positions of convexes 51 on the stamper 55A.

Figure 9:
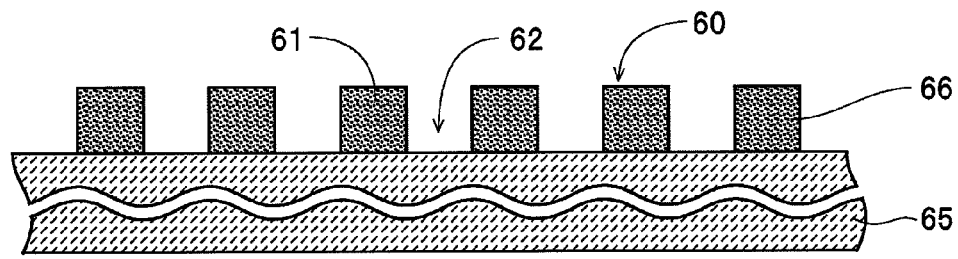
FIG. 9 is a cross-sectional view of a silicon base plate after a concave/convex pattern has been formed thereon.

When manufacturing the stampers 55A, 55B, first as one example, a resist is applied onto a plate-shaped silicon base plate 65 (see FIG. 9) to form a resist layer 66 and then a cutting apparatus (exposure/lithography apparatus: not shown) is used to carry out exposure/lithography on the resist layer 66. When doing so, as one example, when the resist layer 66 is formed using a positive resist, during exposure/lithography, a lithography beam is shone onto regions corresponding to formation positions of concaves 22 in the concave/convex pattern 20a of the magnetic disk 10 to draw the planar pattern of the data track patterns 20t and the servo patterns 20s on the resist layer 66 (i.e., an exposure pattern is formed). Next, by developing the resist layer 66 for which exposure/lithography has been completed, the parts irradiated with the lithography beam are removed from the surface of the silicon base plate 65. By doing so, a concave/convex pattern 60 is formed on the silicon base plate 65. Here, in the concave/convex pattern 60, convexes 61 are formed corresponding to the convexes 21 in the concave/convex pattern 20a (that is, corresponding to the concaves 22 in the concave/convex pattern 20b) and concaves 62 are formed corresponding to the concaves 22 in the concave/convex pattern 20a (that is, corresponding to the convexes 21 in the concave/convex pattern 20b).

Figure 10:
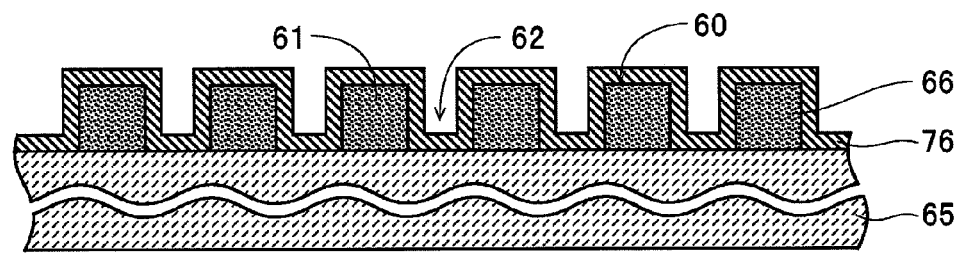
FIG. 10 is a cross-sectional view of the silicon base plate after a conductive layer has been formed on the concave/convex pattern.
Figure 11:
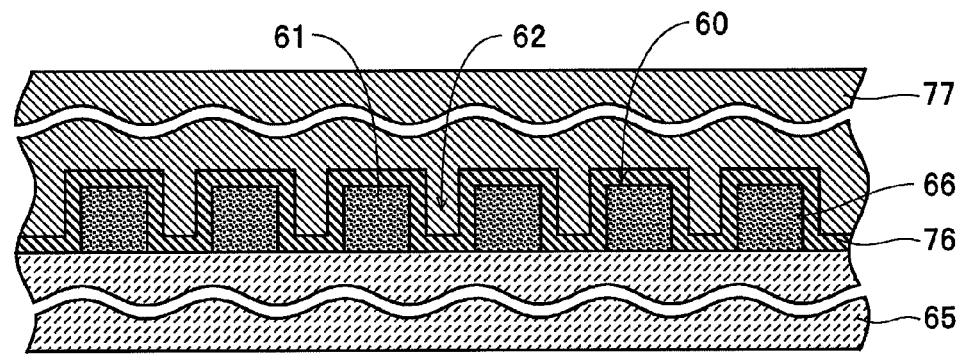
FIG. 11 is a cross-sectional view of the silicon base plate after a plating layer has been formed by electroforming with the conductive layer as an electrode.
Figure 12:
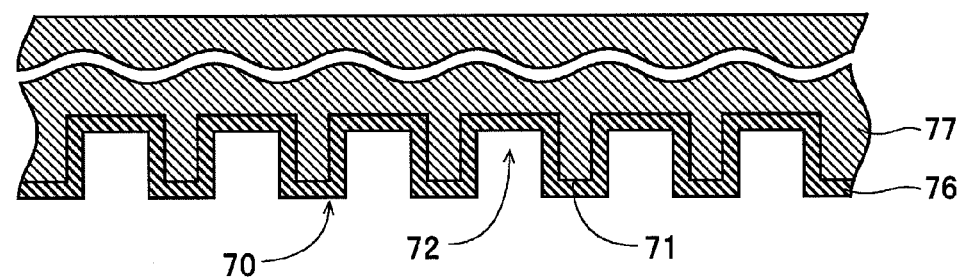
FIG. 12 is a cross-sectional view of a master stamper.

Next, as shown in FIG. 10, after a depositing process, for example, has been carried out on the surface of the concave/convex pattern 60 to form a conductive layer 76, as shown in FIG. 11, a plating layer 77 is formed on the conductive layer 76 by carrying out an electrolytic plating process (electroforming process) using the conductive layer 76 as an electrode. After this, the silicon base plate 65 and the resist layer 66 are separated from the multilayer structure for which the plating process has been completed. By doing so, as shown in FIG. 12, the concave/convex pattern 60 is transferred to the multilayer structure composed of the conductive layer 76 and the plating layer 77 to form a concave/convex pattern 70, thereby completing the master stamper 75. Here, in the concave/convex pattern 70, concaves 72 are formed corresponding to the convexes 21 in the concave/convex pattern 20a (that is, corresponding to the concaves 22 in the concave/convex pattern 20b) and concaves 71 are formed corresponding to the concaves 22 in the concave/convex pattern 20a (that is, corresponding to the convexes 21 in the concave/convex pattern 20b).

Figure 13:
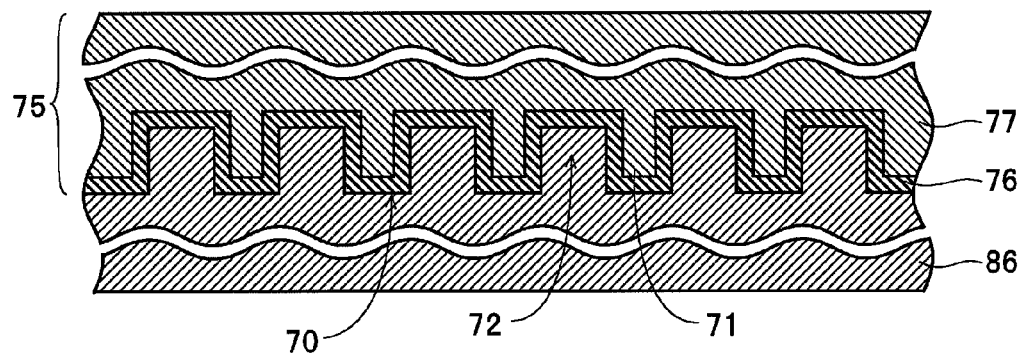
FIG. 13 is a cross-sectional view of the master stamper in a state where a plating layer has been formed by electroforming.
Figure 14:
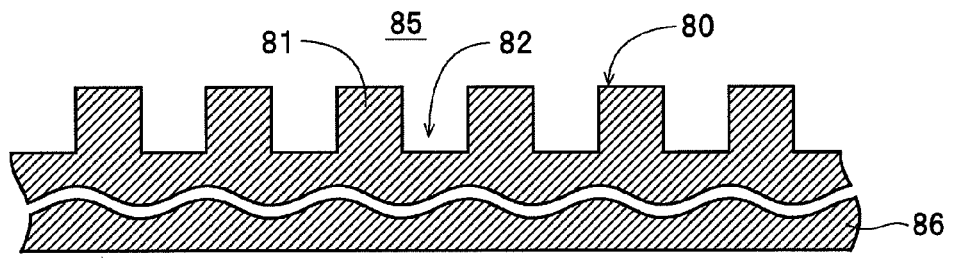
FIG. 14 is a cross-sectional view of a mother stamper.

Next, as shown in FIG. 13, by forming a plating layer 86 by carrying out an electrolytic plating process on the master stamper 75, the concave/convex pattern 70 is transferred to a stamper forming material (for example, nickel). After this, as shown in FIG. 14, by separating the master stamper 75 from the multilayer structure for which the plating process has been completed, a mother stamper 85 with a concave/convex pattern 80 is completed. Here, in the concave/convex pattern 80, convexes 81 are formed corresponding to the convexes 21 in the concave/convex pattern 20a (that is, corresponding to the concaves 22 in the concave/convex pattern 20b) and concaves 82 are formed corresponding to the concaves 22 in the concave/convex pattern 20a (that is, corresponding to the convexes 21 in the concave/convex pattern 20b).

Figure 15:
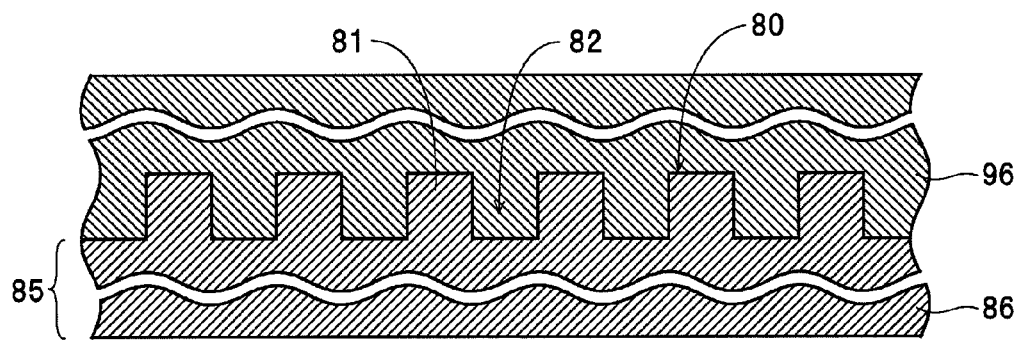
FIG. 15 is a cross-sectional view of the mother stamper in a state where a plating layer has been formed by electroforming.
Figure 16:
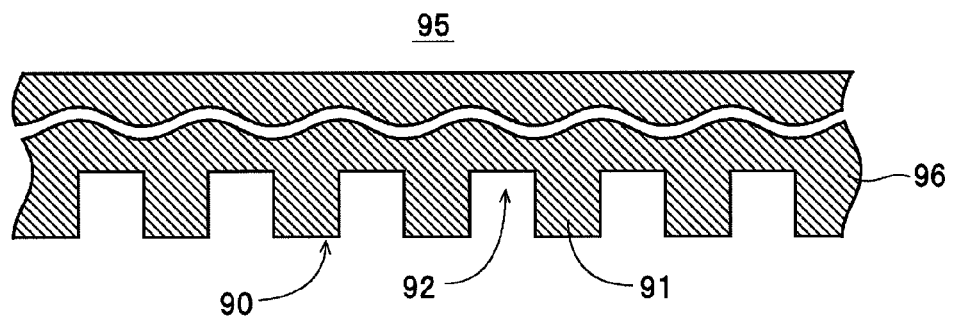
FIG. 16 is a cross-sectional view of a child stamper.

Next, as shown in FIG. 15, by forming a plating layer 96 by carrying out an electrolytic plating process on the mother stamper 85, the concave/convex pattern 80 is transferred to a stamper forming material (for example, nickel). After this, as shown in FIG. 16, by separating the mother stamper 85 from the multilayer structure for which the plating process has been completed, a child stamper 95 with a concave/convex pattern 90 is completed. Here, in the concave/convex pattern 90, convexes 91 are formed corresponding to the concaves 22 in the concave/convex pattern 20a (that is, corresponding to the convexes 21 in the concave/convex pattern 20b) and concaves 92 are formed corresponding to the convexes 21 in the concave/convex pattern 20a (that is, corresponding to the concaves 22 in the concave/convex pattern 20b).

Next, by using the mother stamper 85 and the child stamper 95, the stampers 55A, 55B are manufactured. When doing so, as one example by carrying out injection molding using a polyolefin resin that transmits light (and can transmit UV light), the concave/convex pattern 80 of the mother stamper 85 and the concave/convex pattern 90 of the child stamper 95 are transferred to resin material to manufacture the stampers 55A and 55B. More specifically, the stamper 55A is manufactured by setting the mother stamper 85 into an injection molding apparatus and injecting polyolefin resin into the cavity and the stamper 55B is manufactured by setting the child stamper 95 into the injection molding apparatus and injecting polyolefin resin into the cavity. By doing so, the first stamper for the present invention (i.e., the stamper 55A) and the second stamper for the present invention (i.e., the stamper 55B) are completed.

Figure 17:
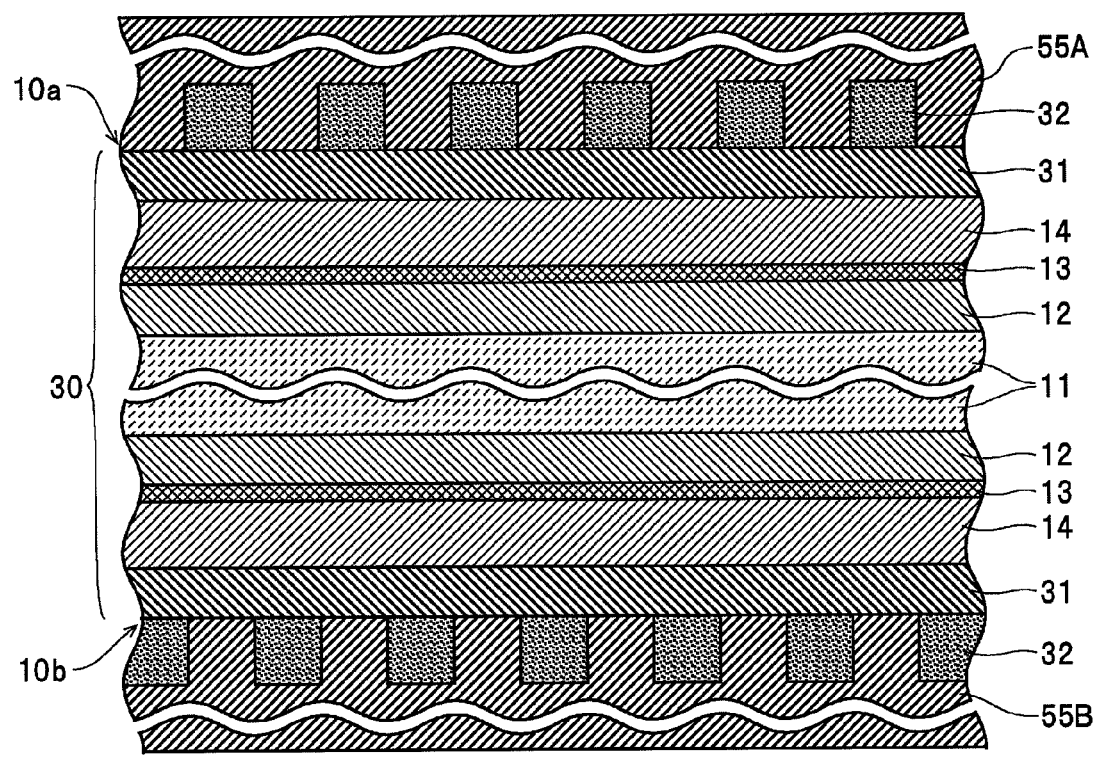
FIG. 17 is a cross-sectional view of the preform in a state where stampers have been pressed onto resin layers thereon.

On the other hand, when manufacturing the magnetic disk 10 using the stampers 55A, 55B, first mask patterns for an etching process are formed on the first surface 10a and the second surface 10b of the preform 30 by imprinting on both sides. More specifically, by applying a UV-curable resin material (as one example, acrylic resin) onto the first surface 10a and the second surface 10b of the preform 30, a resin layer 32 (see FIG. 17) is formed on both surfaces. After this, as shown in FIG. 17, the concave/convex pattern 50a of the stamper 55A is pressed onto the resin layer 32 on the first surface 10a and the concave/convex pattern 50b of the stamper 55B is pressed into the resin layer 32 on the second surface 10b. When doing so, the resin material (resin layer 32) at positions where the respective convexes 51 are pressed in moves inside the concaves 52 in the concave/convex patterns 50a, 50b.

Figure 18:
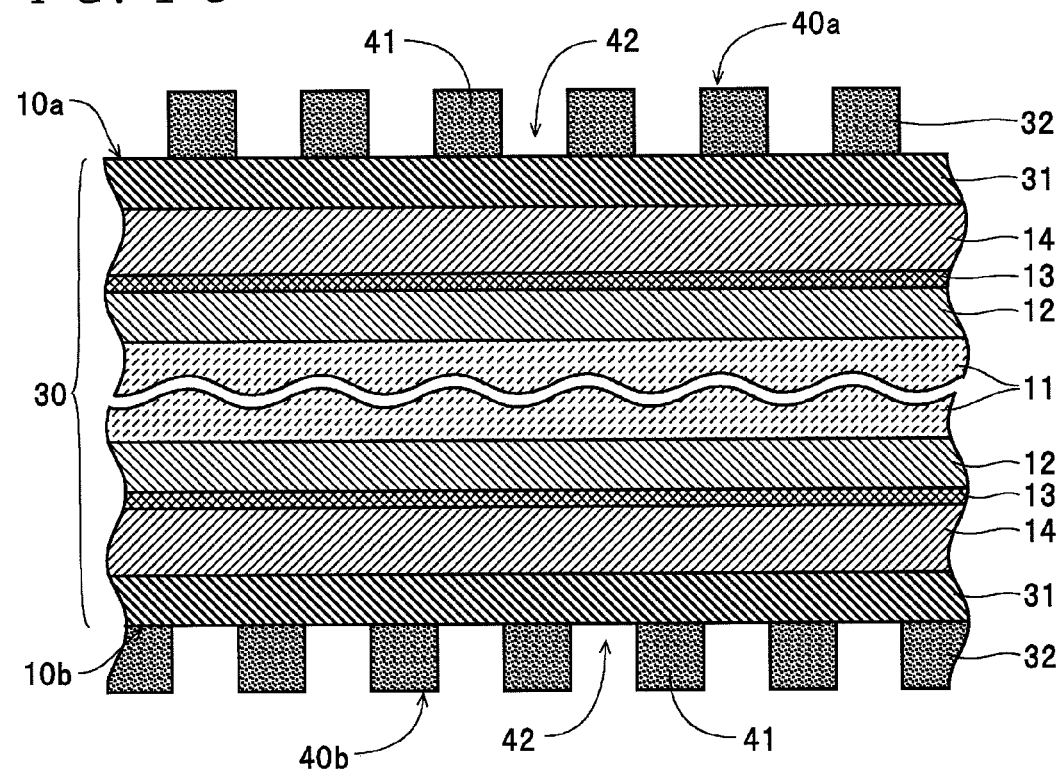
FIG. 18 is a cross-sectional view of the preform in a state where the preform has been separated from the state shown in FIG. 17.

Next, in a state where the convexes 51 have been sufficiently pressed into both resin layers 32, the resin layers 32 are irradiated with UV rays that pass through the stampers 55A, 55B. By doing so, the resin layers 32 are cured. After this, as shown in FIG. 18, the stampers 55A, 55B are separated from the preform 30, and an oxygen plasma process is carried out to remove the resin material (or "residue": not shown) remaining on base surfaces of concaves on both the first surface 1a and the second surface 10b. By doing so, the concave/convex patterns 40a, 40b (or "resin mask patterns") composed of the resin layers 32 are formed on both metal mask layers 31 of the preform 30. Here, on the stamper 40a, convexes 41 are formed corresponding to the convexes 21 in the concave/convex pattern 20a and concaves 42 are formed corresponding to the concaves 22 in the concave/convex pattern 20a. Similarly, on the stamper 40b, the convexes 41 are formed corresponding to the convexes 21 in the concave/convex pattern 20b and the concaves 42 are formed corresponding to the concaves 22 in the concave/convex pattern 20b.

Figure 19:
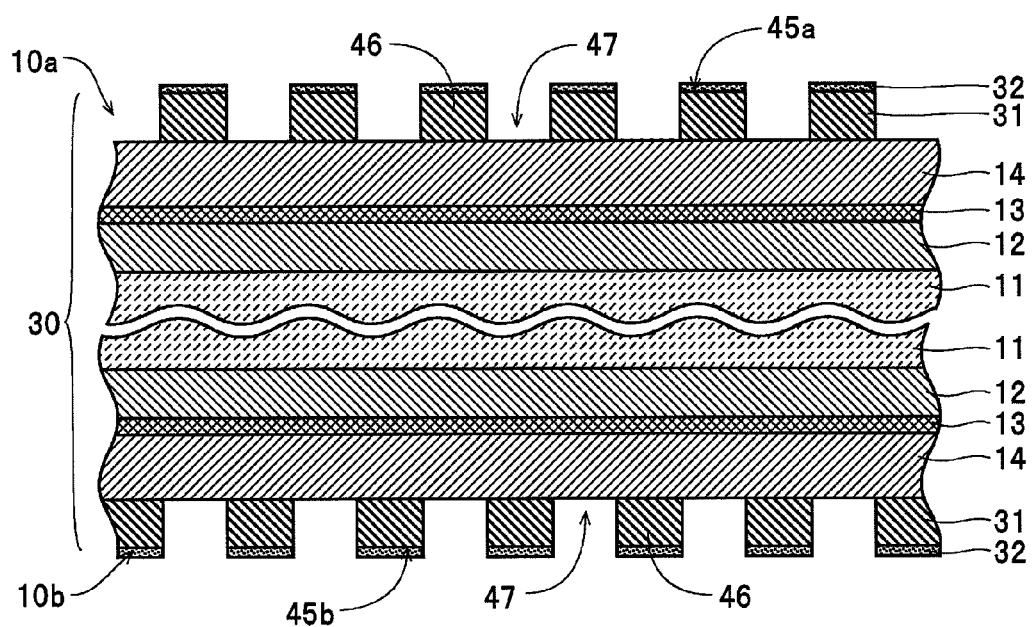
FIG. 19 is a cross-sectional view of the preform in a state where concave/convex patterns have been formed by etching using the resin layers as masks.
Figure 20:
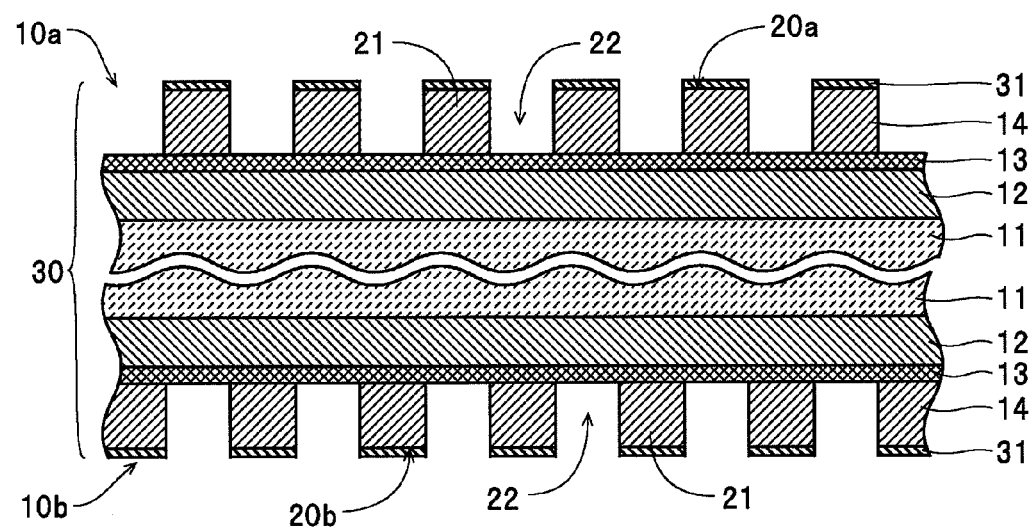
FIG. 20 is a cross-sectional view of the preform in a state where concave/convex patterns have been formed by etching using metal mask layers as masks.

Next, by etching the preform 30 using both resin mask patterns composed of the resin layers 32 described above as masks, as shown in FIG. 19, both metal mask layers 31 are etched to form concave/convex patterns 45a, 45b (or "metal mask patterns") with plural convexes 46 composed of the metal mask layers 31 and plural concaves 47 formed between the convexes 46 by etching the metal mask layers 31 on both magnetic layers 14. After this, by etching the preform 30 using the concave/convex patterns 45a, 45b (the metal mask patterns) as masks, as shown in FIG. 20, the magnetic layers 14 on both the first surface 10a and the second surface 10b are etched to form the concave/convex pattern 20a, 20b with plural convexes 21 and plural concaves 22 on the preform 30. By doing so, the data track patterns 20t and the servo pattern 20s (the concave/convex patterns 20a, 20b) are formed on the intermediate layers 13.

Next, by carrying out an etching process on both the first surface 10a and the second surface 10b to selectively remove the metal mask layers 31 remaining on the convexes 21, the protruding end surfaces of the convexes 21 are exposed. Next, SiO$_2$ is sputtered as the non-magnetic material 15 on both the first surface 10a and the second surface 10b to cover the surfaces on which the concave/convex patterns 20a, 20b are formed with the non-magnetic material 15. After this, ion beam etching is carried out on the layers of the non-magnetic material 15 on the magnetic layers 14 (i.e., on the convexes 21 and on the concaves 22). When doing so, as one example, the ion beam etching continues until the protruding end surfaces of the convexes 21 are exposed from the non-magnetic material 15. By doing so, both the first surface 10a and the second surface 10b of the preform 30 are smoothed.

Next, thin films of diamond-like carbon (DLC) are formed by CVD so as to cover both the first surface 10a and the second surface 10b of the preform 30. In this way, the protective layers 16 are formed on both the first surface 10a and the second surface 10b. After this, a Fomblin lubricant is applied to the surfaces of both protective layers 16 and, as one example, a magnetic field is applied using a DC magnetizing apparatus so as to pass through the magnetic disk 10 in the thickness direction to DC magnetize the convexes 21 on both the first surface 10a and the second surface 10b. By doing so, it becomes possible to magnetically read a servo pattern from each servo pattern region As, thereby completing the magnetic disk 10 as shown in FIG. 4. After this, by installing the completed magnetic disk 10 inside a case together with the magnetic heads 3 and the like, the hard disk drive 1 is completed.

When manufacturing the magnetic disk 10 described above, it is possible to manufacture the stamper 55A for the first surface 10a and the stamper 55B for the second surface 10b using a single master stamper 75 (i.e., one exposure/lithography process). Accordingly, when manufacturing a magnetic disk 10 with a diameter of 3.5 inches, for example, although one hundred days were required by exposure/lithography for the conventional magnetic disk, exposure/lithography for manufacturing both stampers 55A, 55B can be completed in fifty days, or half the time. In this way, there is a very large difference between the method of manufacturing the magnetic disk 10 and the method of manufacturing the conventional magnetic disk described above in the time required by exposure/lithography.

On the other hand, in the hard disk drive 1 described above, the control unit 6 uses the servo control data D inside the storage unit 7 to carry out different tracking servo control during a recording/reproducing process for data on the first surface 10a of the magnetic disk 10 and a recording/reproducing process for recorded data on the second surface 10b. On the magnetic disk 10 installed in the hard disk drive 1, as described earlier, the formation positions of the convexes 21 (i.e., data recording tracks) and the concaves 22 are reversed in the data recording regions At on the first surface 10a and the data recording regions At on the second surface 10b. Accordingly, as shown in FIG. 5, the track centers of the data recording tracks in the data recording regions At on the first surface 10a are the positions shown by the arrows Ca and the track centers of the data recording tracks in the data recording regions At on the second surface 10b are the positions shown by the arrows Cb, so that the respective track centers are displaced in the radial direction by one half of the track pitch of the data recording tracks.

Accordingly, when making the magnetic head 3 on-track to a data recording track in the data recording region At of the first surface 10a, the control unit 6 carries out tracking servo control to position the magnetic head 3 on the center of a servo track (such positions are shown by the broken lines in FIG. 5) specified by the servo patterns in the servo pattern regions As. Also, when making the magnetic head 3 on-track to a data recording track in the data recording region At of the second surface 10b, the control unit 6 carries out tracking servo control to offset the magnetic head 3 by one half of the track pitch, for example, toward the inner periphery or the outer periphery in the radial direction of the magnetic disk 10 with respect to a center of a servo track specified by the servo patterns in the servo pattern regions As. By doing so, the control unit 6 makes the magnetic heads 3 on-track to desired data recording tracks on both the first surface 10a and the second surface 10b and carries out recording and reproducing of data (i.e., reads and writes of magnetic signals).

In this way, on the magnetic disk 10, in the data track patterns 20t on the first surface 10a (the "one surface"), concaves 22 (non-recording regions) are formed at formation positions on the first surface 10a corresponding to formation positions of convexes 21 (recording regions) in the data track patterns 20t on the second surface 10b (the "other surface") and convexes 21 are formed at formation positions on the first surface 10a corresponding to formation positions of concaves 22 in the data track patterns 20t on the second surface 10b (the "other surface") and in the servo patterns 20s on the first surface 10a, concaves 22 are formed at formation positions on the first surface 10a corresponding to formation positions of convexes 21 in the servo patterns 20s on the second surface 10b and convexes 21 are formed at formation positions on the first surface 10a corresponding to formation positions of concaves 22 in the servo patterns 20s on the second surface 10b. The hard disk drive 1 is also equipped with the magnetic disk 10 described above.

In the method of manufacturing the magnetic disk 10, the data track patterns 20t and the servo patterns 20s are formed on the first surface 10a of the magnetic disk 10 using the stamper 55A (the "first stamper") that has the concave/convex pattern 50a (the "first concave/convex pattern"), and the data track patterns 20t and the servo patterns 20s are formed on the second surface 10b of the magnetic disk 10 using the stamper 55B (the "second stamper") that has the concave/convex pattern 50b (the "second concave/convex pattern") in which the concaves 52 are formed at formation positions corresponding to formation positions of convexes 51 in the concave/convex pattern 50a and the convexes 51 are formed at formation positions corresponding to formation positions of concaves 52 in the concave/convex pattern 50a.

Therefore, according to the magnetic disk 10, the hard disk drive 1, and the method of manufacturing the magnetic disk 10, the stamper 55A for forming the concave/convex pattern 20a on the first surface 10a and the stamper 55B for forming the concave/convex pattern 20b on the second surface 10b that are used during the manufacturing of the magnetic disk 10 can be manufactured by carrying out a single exposure/lithography process during the manufacturing of the master stamper 75. This means that compared to the conventional magnetic disk where at least two exposure/lithography processes are required to manufacture two types of stampers, i.e., a front surface stamper and a rear surface stamper, it is possible during manufacturing to sufficiently reduce the time required to manufacture the stampers, and therefore it is possible to sufficiently reduce the manufacturing cost of the magnetic disk 10 and the hard disk drive 1 that is equipped with the magnetic disk 10.

Note that the present invention is not limited to the construction and method described above. For example, although an example has been described where the magnetic disk 10 is manufactured by forming the concave/convex pattern 40a on the first surface 10a of the preform 30 using the stamper 55A manufactured by injection molding using the mother stamper 85 and forming the concave/convex pattern 40b on the second surface 10b of the preform 30 using the stamper 55B manufactured by injection molding using the child stamper 95, the method of manufacturing a magnetic recording medium according to the present invention is not limited to this. For example, it is also possible to manufacture the magnetic disk 10 by forming the concave/convex pattern 40a on the first surface 10a of the preform 30 using a stamper (i.e., another example of a "first stamper" for the present invention: a resin stamper with the same concave/convex pattern as the concave/convex pattern 50a described above, not shown) manufactured by injection molding using a grandchild stamper (not shown) that has been manufactured by transferring a pattern of the child stamper 95 to a stamper forming material (as one example, nickel). It is also possible to manufacture the magnetic disk 10 by forming the concave/convex pattern 40b on the second surface 10b of the preform 30 using a stamper (i.e., another example of a "second stamper" for the present invention: a resin stamper with the same concave/convex pattern as the concave/convex pattern 50b described above, not shown) manufactured by injection molding using the master stamper 75.

It is also possible to manufacture the magnetic disk 10 described above by carrying out a pattern transferring process plural times for the master stamper 75, the mother stamper 85, and the child stamper 95 to manufacture a stamper where the formation positions of the concaves and convexes match the stamper 55A and a stamper where the formation positions of the concaves and convexes match the stamper 55B and carrying out imprinting with such stampers as the first stamper and the second stamper for the present invention to form the concave/convex patterns 40a, 40b on the first surface 10a and the second surface 10b of the preform 30.

In addition, the first and second stampers for the present invention are not limited to resin stampers such as the stampers 55A, 55B and also include the master stamper 75, the mother stamper 85, the child stamper 95, and stampers (not shown) which are formed with metal material (such as nickel) as the stamper forming material like the stampers 75 to 95. More specifically, it is possible to manufacture the magnetic disk 10 by forming the concave/convex pattern 40a on the first surface 10a of the preform 30 by imprinting using the master stamper 75 or the child stamper 95, for example, as the first stamper for the present invention. Similarly, it is possible to manufacture the magnetic disk 10 by forming the concave/convex pattern 40b on the second surface 10b of the preform 30 by imprinting using the mother stamper 85 or the grandchild stamper described above as the second stamper for the present invention.

Figure 21:
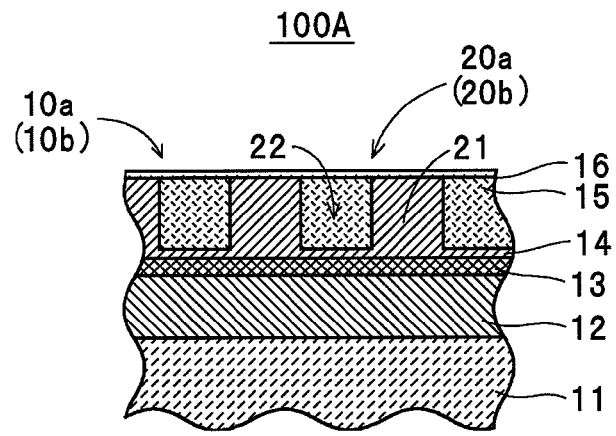
FIG. 21 is a cross-sectional view of a magnetic disk according to another embodiment.

In addition, although the magnetic disk 10 where the entire regions from the protruding end parts to the base end parts of the convexes 21 in the concave/convex patterns 20a, 20b (i.e., the data track patterns 20t and the servo patterns 20s) are formed by the magnetic layers 14 (i.e., the magnetic material) has been described as an example, the construction of the magnetic recording medium according to the present invention is not limited to this. More specifically, as one example, it is also possible to construct the data track patterns 20t and the servo patterns 20s of concave/convex patterns 20a, 20b that include convexes 21 where only the protruding end parts of the convexes 21 are formed of the magnetic layers 14 and the base end parts of the convexes 21 are formed of the intermediate layers 13 and/or the soft magnetic layers 12, and concaves 22 whose base surfaces are formed in the thickness of the intermediate layers 13 and/or the soft magnetic layers 12. Also, like a magnetic disk 100A shown in FIG. 21, it is possible to construct the concave/convex patterns 20a, 20b so that not only the convexes 21 but also the bottom parts of the concaves 22 are formed of the magnetic layers 14.

Figure 22:
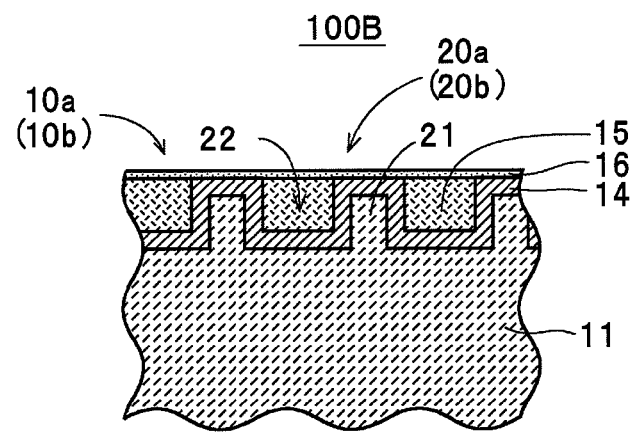
FIG. 22 is a cross-sectional view of a magnetic disk according to yet another embodiment.

In addition, like a magnetic disk 100B shown in FIG. 22, by forming the magnetic layers 14 so as to cover concave/convex patterns formed in the glass substrate 11 (i.e., concave/convex patterns where the convexes and concaves have the same formation positions as in the concave/convex patterns 20a, 20b), it is possible to construct the concave/convex patterns 20a, 20b (i.e., the data track patterns 20t and the servo patterns 20s) of plural convexes 21 whose surfaces are formed of magnetic material and plural concaves 22 whose bottom surfaces are also formed of the magnetic material. Here, as one example of the method of forming concave/convex patterns in the glass substrate 11 where the concaves and convexes have the same formation positions as the concave/convex patterns 20a, 20b, it is possible to carry out a molding process using the first and second stampers for the present invention to transfer the concave/convex patterns of both stampers to the first surface 10a and the second surface 10b of the glass substrate 11. Also, in place of a molding process that uses the stampers, it is possible to form mask patterns on the first surface 10a and the second surface 10b of the glass substrate 11 by carrying out imprinting using the first stamper and the second stamper for the present invention and then carrying out etching using such mask patterns to form concave/convex patterns (i.e., concaves) on the first surface 10a and the second surface 10b of the glass substrate 11.

Figure 23:
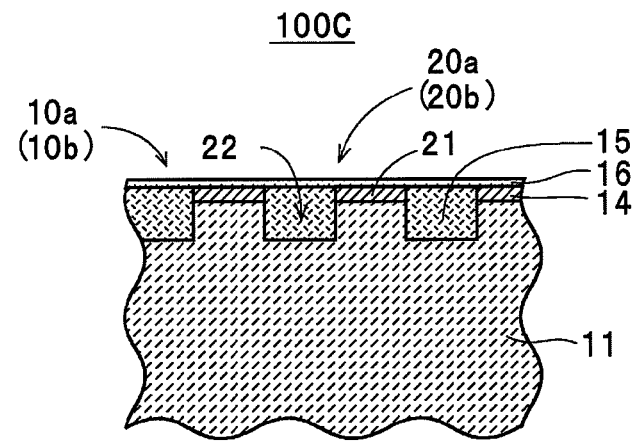
FIG. 23 is a cross-sectional view of a magnetic disk according to yet another embodiment.

As another example, like a magnetic disk 100C shown in FIG. 23, it is also possible to construct the concave/convex patterns 20a, 20b so as to include plural convexes 21 where only the protruding end parts of the convexes 21 are formed of the magnetic layer 14 and the base end parts of the convexes 21 are formed of a non-magnetic material or a soft magnetic material (in the illustrated example, the glass substrate 11). Here, for the magnetic disk 100C shown in FIG. 23, only the protruding end parts of the convexes 21 are formed of the magnetic layers 14, but it is also possible to use a construction where the magnetic layers 14 are also formed on the base surfaces of the concaves 22 between adjacent convexes 21 (a construction where the magnetic layers 14 are not present on the side surfaces of the convexes 21 on the magnetic disk 100B described earlier: not shown).

In addition, it is also possible to construct a magnetic disk (not shown) by filling concaves in a concave/convex pattern formed in a layer of non-magnetic material with the magnetic material that constructs the magnetic layers 14 described above and setting the positions of the convexes in the non-magnetic material as the non-recording regions (i.e., regions corresponding to the concaves 22 of the magnetic disk 10 and the like) and positions of the magnetic material filled inside the concaves as the recording regions (i.e., regions corresponding to the convexes 21 of the device 10 and the like) (not shown). Here, as one example of the method of forming the concave/convex patterns in the layers of the non-magnetic material when manufacturing this magnetic disk, it is possible to form mask patterns on both surfaces of a substrate (which has layers of non-magnetic material formed on one surface and another surface thereof) by imprinting using the first and second stampers for the present invention and then carrying out etching using the mask patterns to form concave/convex patterns (i.e., concaves) in both layers of non-magnetic material on the substrate.

It is also possible to construct a magnetic disk (not shown) by selectively modifying desired regions in a layer of magnetic material to form regions whose ability to store a magnetic signal in a readable manner is lower than the periphery thereof or regions that effectively do not have such an ability, setting regions whose ability to store a magnetic signal in a readable manner is high as the recording regions (i.e., regions corresponding to the convexes 21 of the magnetic disk 10 and the like), and setting regions whose ability to store a magnetic signal in a readable manner is low as non-recording regions (i.e., regions corresponding to the concaves 22 of the magnetic disk 10 and the like)(not shown). Here, as the method of manufacturing this magnetic disk, it is possible to form mask patterns on both surfaces of a substrate that has layers of magnetic material formed on one surface and another surface thereof by imprinting using the first and second stampers for the present invention, and then carrying out an irradiating process with a beam or a reactive process with reactive gas using the mask patterns to modify the magnetic material exposed from the mask patterns and thereby form the recording regions and non-recording regions on the one surface and the other surface of the substrate.

What is claimed is:

1. A magnetic recording medium where data track patterns and servo patterns are formed on one surface and another surface of a disk-shaped substrate by patterns including recording regions and non-recording regions, wherein in the data track patterns on the one surface, the non-recording regions are formed at formation positions on the one surface corresponding to formation positions of all of the recording regions in the data track patterns on the other surface and the recording regions are formed at formation positions on the one surface corresponding to formation positions of all of the non-recording regions in the data track patterns on the other surface, and in the servo patterns on the one surface, the non-recording regions are formed at formation positions on the one surface corresponding to formation positions of all of the recording regions in the servo patterns on the other surface and the recording regions are formed at formation positions on the one surface corresponding to formation positions of all of the non-recording regions in the servo patterns on the other surface.

2. A recording/reproducing apparatus, comprising:

the magnetic recording medium according to claim 1;

a magnetic head that carries out a read of a magnetic signal from the magnetic recording medium and a write of a magnetic signal onto the magnetic recording medium; and a control unit that extracts servo data based on the magnetic signal read from servo pattern regions of the magnetic recording medium and carries out tracking servo control of the magnetic head based on the extracted servo data.

3. A method of manufacturing the magnetic recording medium according to claim 1 where the data track patterns and the servo patterns are formed on the one surface and the other surface of the substrate, the method comprising:

forming the data track patterns and the servo patterns on the one surface using a first stamper on which a first concave/convex pattern is formed and forming the data track patterns and the servo patterns on the other surface using a second stamper on which a second concave/convex pattern is formed, where in the second concave/convex pattern, concaves are formed at formation positions corresponding to formation positions of convexes in the first concave/convex pattern and convexes are formed at formation positions corresponding to formation positions of concaves in the first concave/convex pattern.

* * * * *